United States Patent [19]
Ebnöther et al.

[11] 3,928,360
[45] Dec. 23, 1975

[54] 1,3,4,9B-TETRAHYDRO-2H-INDENO[1,2-C]PYRIDINES

[75] Inventors: Anton Ebnöther, Arlesheim; Jean-Michel Bastian, Therwil; Erwin Rissi, Basel, all of Switzerland

[73] Assignee: Sandoz Ltd., Basel, Switzerland

[22] Filed: Nov. 29, 1973

[21] Appl. No.: 419,991

Related U.S. Application Data

[63] Continuation-in-part of Ser. No. 264,423, June 20, 1972, abandoned, Continuation-in-part of Ser. No. 72,800, Sept. 16, 1970, abandoned.

[30] Foreign Application Priority Data

| Sept. 23, 1969 | Switzerland | 14317/69 |
|---|---|---|
| Dec. 18, 1969 | Switzerland | 18830/69 |
| Apr. 23, 1970 | Switzerland | 6078/70 |
| June 3, 1970 | Switzerland | 8267/70 |
| Sept. 23, 1969 | Switzerland | 14318/69 |
| Dec. 16, 1969 | Switzerland | 18671/69 |
| Apr. 23, 1970 | Switzerland | 6079/70 |
| June 3, 1970 | Switzerland | 8268/70 |
| Sept. 23, 1969 | Switzerland | 14319/69 |
| Apr. 23, 1970 | Switzerland | 6080/70 |
| June 3, 1970 | Switzerland | 8269/70 |

[52] U.S. Cl. .......................... 260/293.54; 424/267
[51] Int. Cl.² .................................. C07D 221/16
[58] Field of Search ........................ 260/293.54

[56] References Cited
UNITED STATES PATENTS
3,573,316   3/1971   Ebnöther et al. ............... 260/294.7

*Primary Examiner*—G. Thomas Todd
*Attorney, Agent, or Firm*—Gerald D. Sharkin; Robert S. Honor

[57] ABSTRACT

The present invention concerns novel heterocyclic compounds of the formula:

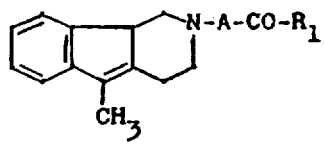

wherein $R_1$ is lower alkyl of one to four carbon atoms, cycloalkyl of five or six carbon atoms, phenyl, or phenyl monosubstituted by chlorine, bromine, fluorine, methoxy, methylthio or lower alkyl of one to four carbon atoms, and A is a straight or branched alkylene chain of one to four carbon atoms.

The compounds exhibit central nervous system depressant properties and are useful in the treatment of overt and hidden aggression.

33 Claims, No Drawings

1,3,4,9B-TETRAHYDRO-2H-INDENO[1,2-C]PYRIDINES

This is a continuation-in-part of our copending application Ser. No. 264,423 filed June 20, 1972, now abandoned, which in turn is a continuation-in-part of our application Ser. No. 72,800 filed Sept. 16, 1970, now abandoned.

The invention provides new heterocyclic compounds of formula I,

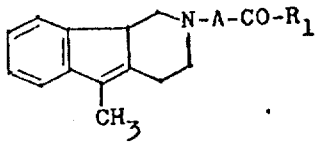

wherein
$R_1$ is lower alkyl of one to four carbon atoms, cycloalkyl of five or six carbon atoms, phenyl, or phenyl monosubstituted by chlorine, bromine, fluorine, methoxy, methylthio or lower alkyl of one to four carbon atoms, and
A is a straight or branched alkylene chain of one to four carbon atoms,
and processes for the production thereof.

In accordance with the invention the new compounds of formula I are obtained by a. reacting the compound of formula II,

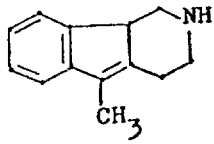

or a salt thereof, with a compound of formula III,

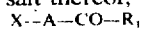

wherein
$R_1$ and A are as defined above, and
X is the acid radical of a reactive ester,
in an inert solvent and in the presence of an acid-binding agent, or b. reacting the compound of formula II, or a salt thereof, with a compound of formula IIIa,

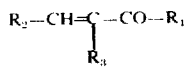

in an inert solvent, to produce a compound of formula Ia,

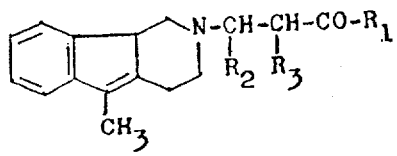

wherein the above formulae IIIa and Ia R
$R_2$ and $R_3$ are hydrogen, or alkyl of one to two carbon atoms, and
$R_1$ is as defined above, or c. reacting the compound of formula II, or a salt thereof, with formaldehyde and a compound of formula IIIb,

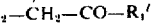

wherein
$R_2$ is as devined above, and
$R_1'$ is tertiary lower alkyl, phenyl, or phenyl monosubstituted by chlorine, bromine, fluorine, methoxy, methylthio or lower alkyl of one to four carbon atoms,
in a neutral or weakly acid inert solvent medium, under the conditions of a Mannich reaction, to produce a compound of formula Ib,

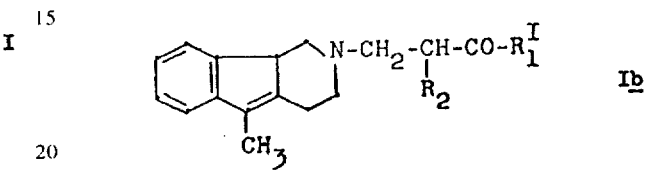

wherein $R_1'$ and $R_2$ are as defined above.

Process (a) may, for example, be effected by reacting the compound of formula II, or a salt thereof, with a compound of formula III, preferably a compound III wherein X is chlorine, bromine, methyl or p-toluenesulphonic acid, in an inert solvent, e.g. an aromatic hydrocarbon such as toluene or benzene, or a chlorinated hydrocarbon such as chloroform or carbon tetrachloride, or a di(lower)alkyl amide of a lower carboxylic acid, such as dimethyl formamide, and in the presence of an acid-binding agent, e.g. an alkali metal carbonate such as sodium or potassium carbonate, or a tertiary base such as triethyl amine, or an excess of the compound of formula II, at a temperature between 40° and 100°C, conveniently at the boiling temperature of the reaction mixture.

For example, the compound of formula II and potassium carbonate may be suspended in dimethyl formamide, and a solution of a compound of formula III in the same solvent may be added at an elevated temperature, e.g. 70°C, while stirring. After the reaction is complete, the reaction product may be isolated and purified in known manner.

Process (b) may, for example, be effected by reacting a compound of formula II with a compound of the formula IIIa in an inert solvent, e.g. a lower alcohol such as ethanol, or a di(lower)alkyl amide of a lower carboxylic acid, such as dimethyl formamide, preferably at an elevated temperature, e.g. at 50°C to the boiling temperature of the reaction mixture, and optionally in the presence of an organic base such as triethyl amine and/or a strong basic catalyst, e.g. benzyl trimethyl ammonium hydroxide.

For example, the compound of formula II and a compound of formula IIIa may be dissolved in ethanol and the solution heated to 80°C for about 2 hours. After the reaction is complete, the reaction product may be isolated and purified in conventional manner.

Reaction of the compound of formula II, or its salts, with formaldehyde and a compound of formula IIIb may, for example, take place at an elevated temperature, conveniently at a temperature between 50°C and the boiling temperature of the reaction mixture. A lower alcohol such as ethanol is preferably used as inert solvent when the substituent $R_1'$ is phenyl or monosubstituted phenyl. When $R_1'$ is tertiary lower alkyl, glacial acetic acid is preferably used as solvent. Isolation of the reaction product may be effected in known manner.

The compounds of formula I may be administered in pharmaceutically acceptable acid addition salt form. Such salts possess the same order of activity as the free bases and are readily prepared in conventional manner. Suitable salts are organic salts such as the acetate, succinate or benzene- or methane-sulphonate and inorganic salts such as the sulphate, hydrobromide or hydrochloride.

The straight or branched alkylene chain represented by the symbol A preferably contains one to three carbon atoms.

The compounds of formula I and pharmaceutically acceptable acid addition salts thereof are useful because they possess pharmacological properties in animals. In particular the compounds are useful in the treatment of conditions of overt or hidden aggression as indicated by behavioural studies in mice on i.p. as well as p.o. administration of 3 mg/kg animal body weight of the test compound, and in tests of aggressive behaviour induced in the cat by electrical stimulation of particular areas of the hypothalmus, on i.p. as well as p.o. administration of 1 to 5 mg/kg animal body weight of the test compound. In the tests on mice, aggression is induced by isolating male mice for a minimum period of four weeks (Yen et al, J. Pharmacol. Exp. Ther. 122, 85A 1958) and the mice exhibit typical patterns of offensive aggressive behaviour when two of them are placed together in a cage. Aggressive behaviour was also induced in mice by electric shock (Tedeschi et al, J. Pharmacol. Exp. Ther. 125, 28, 1959), in which the mice take up a characteristic defensive position, considered as a defensive aggression reaction. It was found that offensive aggression was inhibited at lower dosages than defensive aggression was inhibited so that the compounds can be regarded as being specific in action. Sedation was measured by standard tests on motor activity in mice (light-beam cage, climbing test and rotarod) and it was shown that inhibition of motor activity does occur. The compounds also are devoid of significant anti-depressant activity at the low dosages where inhibition of isolation-induced aggression occurs. Anti-depressant activity involving central nervous stimulation is clearly a property highly undesirable in an anti-aggressive agent. The psychopharmacological properties of the compounds indicate they are suitable in the treatment of conditions in which sedation and inhibition of aggression are desirable, such as in aggressive behaviour in erethic oligophrenics and aggressive behaviour in psychotics and possibly in psychopaths.

For the abovementioned use, the dosage administered will naturally vary depending on the compound employed, the mode of administration and the treatment desired. However, in general, satisfactory results are obtained at daily doses between about 0.1 and about 30 milligrams per kilogram animal body weight, conveniently given in divided doses two to three times a day or in sustained release form. For the larger mammals, the total daily dose is from about 5 to about 500 milligrams, and dosage forms suitable for oral administration comprise from about 2 to about 250 milligrams of the compound, in association with a solid or liquid pharmaceutical carrier or diluent. Thus the compounds of formula I, or their pharmaceutically acceptable acid addition salts, may be administered orally in such forms as tablets, capsules, elixirs, suspensions and the like, or parenterally in the form of an injectable solution or suspension.

The production of the starting materials may be effected in accordance with known processes or in a manner analogous to known processes. The compound of formula II may be prepared as described in the last of the following Examples. Free base forms of the compounds of formula I are, for example, obtained by treating the pure, crystalline, e.g. hydrochloride, salt forms with potassium carbonate, extracting with chloroform and evaporating to a residue. The free base forms of the compounds of formula I are useful intermediates for the preparation, in conventional manner, of pharmaceutically acceptable acid addition salt forms.

In the following Examples, which illustrate the invention without in any way limiting its scope, all temperatures are indicated in degrees Centigrade and are uncorrected.

EXAMPLE 1

2-Acetonyl-1,3,4,9b-tetrahydro-5-methyl-2H-indeno[1,2-c]pyridine

A mixture of 20.6 g of 1,3,4,9b-tetrahydro-5-methyl-2H-indeno[1,2-c]pyridine, 18.4 g of potassium carbonate and 10.7 cc of chloro acetone in 130 cc of dry chloroform is heated to the boil for 17 hours while stirring. After cooling the reaction mixture is filtered and the filtrate is washed with water. Drying is effected over magnesium sulphate, the solvent is removed by evaporation and the residue is dissolved in ethanonl. The calculated amount of hydrochloric acid in ethanol is added and the mixture is allowed to crystallize. Pure 2-acetonyl-1,3,4,9b-tetrahydro-5-methyl-2H-indeno[1,2-c]pyridine hydrochloride, having a M.P. of 214°–215°, is obtained without further purification.

EXAMPLE 2

1,3,4,9b-Tetrahydro-5-methyl-2-(2-oxophenethyl)2H-indeno[1,2-c]pyridine

A solution of 12.2 g of phenacyl chloride in 25 cc of dimethyl formamide is added dropwise at 70° while stirring to a suspension of 15.8 g of 1,3,4,9b-tetrahydro-5-methyl-2H-indeno[1,2-c]pyridine hydrochloride and 21.65 g of potassium carbonate in 60 cc of dimethyl formamide. The reaction mixture is allowed to react for a further hour at 70° and is then poured into 1000 cc of water. The reaction mixture is made strongly alkaline with a dilute sodium hydroxide solution, is extracted with benzene, and the extracts are dried over magnesium sulphate. The residue obtained after removing the solvent by evaporation is dissolved in ethanol and the calculated amount of hydrochloric acid in ethanol is added. The reaction solution is diluted with ether until it becomes slightly turbid and is then allowed to crystallize slowly. Pure 1,3,4,9b-tetrahydro-5-methyl-2-(2-oxophenethyl)-2H-indeno[1,2-c]pyridine hydrochloride, having a M.P. of 202°–205° (decomp.), is obtained.

The following compounds of formula I (Examples 3 to 7) may likewise be obtained in a manner analogous to that described in Example 2:

EXAMPLE 3

1,3,4,9b-Tetrahydro-5-methyl-2-(5-methyl-3-oxohexyl)-2H-indeno[1,2-c]pyridine

M.P. of the hydrochloride—184°–186° (decomp.).

EXAMPLE 4

1,3,4,9b-Tetrahydro-5-methyl-2-(3-oxobutyl)-2H-indeno[1,2-c]pyridine

M.P. of the hydrogen fumarate—185°–186° with decomposition after a previous M.P. of 144°.

M.P. of the methane sulphonate—160.5°–161.5° (decomp.).

M.P. of the hydrochloride—164°–166° (decomp.).

The title compound of this example is an effective antiaggressive agent when administered orally or parenterally to an animal in need of such treatment at a dosage of 100 mg twice per day.

EXAMPLE 5

1,3,4,9b-Tetrahydro-5-methyl-2-(2-methyl-3-oxobutyl)-2H-indeno[1,2-c]pyridine

M.P. of the hydrochloride—180°–182° (decomp.).

EXAMPLE 6

1,3,4,9b-Tetrahydro-5-methyl-2-(3-oxopentyl)-2H-indeno[1,2-c]pyridine

M.P. of the hydrochloride—176°–178° (decomp.).

EXAMPLE 7

1,3,4,9b-Tetrahydro-5-methyl-2-(4,4-dimethyl-3-oxopentyl)-2H-indeno[1,2-c]pyridine M.P. of the hydrochloride—193°–194° (decomp.).

EXAMPLE 8

1,3,4,9b-Tetrahydro-5-methyl-2-(4-methyl-3-oxopentyl)-2H-indeno[1,2-c]pyridine.

A solution of 13.2 g of 1-chloro-4-methyl-3-pentanone is added dropwise at 50° within 2 hours while stirring to a suspension of 18.0 g of 1,3,4,9b-tetrahydro-5-methyl-2H-indeno[1,2-c]pyridine hydrochloride, 28.1 g of potassium carbonate and 1.3 g of potassium iodide in 200 cc of dimethyl formamide. The reaction mixture is allowed to react at 50° for a further hour and is then diluted with 500 cc of benzene. Extraction is effected thrice with water, the organic phase is dried over magnesium sulphate and the solvent is removed by evaporation. The residue is dissolved in acetone and the calculated amount of hydrochloric acid in ethanol is added. After recrystallization of the resulting crude crystalline product from methanol/ether, the hydrochloride of the title compound, having a M.P. of 180°–182° (decomp.), is obtained.

The following compounds of formula I (Examples 9 and 10) may be obtained in a manner analogous to that described in Example 8:

EXAMPLE 9

1,3,4,9b-Tetrahydro-5-methyl-2-(4-oxopentyl)-2H-indeno[1,2-c]pyridine

M.P. of the hydrochloride—186°–188°.

EXAMPLE 10

2-(4-p-Fluorophenyl-4-oxobutyl)-1,3,4,9b-tetrahydro-5-methyl-2H-indeno[1,2-c]pyridine M.P. of the hydrochloride 227°–229°.

EXAMPLE 11

2-(3-Cyclopentyl-3-oxopropyl)-1,3,4,9b-tetrahydro-5-methyl-2H-indeno[1,2-c]pyridine A solution of 19.6 g of 1-chloro-3-cyclopentyl-3-propanone in 50 cc of dimethyl formamide is added dropwise at a temperature of 50° while stirring to a solution of 18.0 g of 1,3,4,9b-tetrahydro-5-methyl-2H-indeno[1,2-c]pyridine hydrochloride and 20.0 g of triethyl amine in 100 cc of dimethyl formamide. The reaction mixture is subsequently allowed to react at the same temperature for a further 10 minutes and is then diluted with benzene. The reaction mixture is extracted 4 times with water and the organic phase is dried over magnesium sulphate. The solvent is removed by evaporation at reduced pressure, the residue is dissolved in methanol and the calculated amount of hydrochloric acid in ethanol and ether are added. The resulting crystalline product is again recrystallized from methanol/ether. M.P. of the hydrochloride 196°–198° (decomp.).

The following compounds of formula I (Examples 12 to 16) may be obtained in a manner analogous to that described in Example 11:

EXAMPLE 12

2-(3-Cyclohexyl-3-oxopropyl)-1,3,4,9b-tetrahydro-5-methyl-2H-indeno[1,2-c]pyridine M.P. of the hydrochloride—194°–196° (decomp.).

EXAMPLE 13

1,3,4,9b-Tetrahydro-2-m-methoxyphenacyl-5-methyl-2H-indeno[1,2-c]pyridine

M.P. of the hydrochloride—199°–202° (decomp.).

EXAMPLE 14

2-p-Bromophenacyl-1,3,4,9b-tetrahydro-5-methyl-2H-indeno[1,2-c]pyridine

M.P. of the hydrochloride—233°–235° (decomp.) from isopropanol/water.

EXAMPLE 15

2-p-Chlorophenacyl-1,3,4,9b-tetrahydro-5-methyl-2H-indeno[1,2-c]pyridine

M.P. of the hydrochloride—230°–232° (decomp.) from methanol.

EXAMPLE 16

1,3,4,9b-Tetrahydro-2-p-methoxyphenacyl-5-methyl-2H-indeno[1,2-c]pyridine

M.P. of the hydrochloride—221°–223° from ethanol.

EXAMPLE 17

1,3,4,9b-Tetrahydro-5-methyl-2-(3-oxobutyl)-2H-indeno[1,2-c]pyridine

A solution of 10.0 g of 1,3,4,9b-tetrahydro-5-methyl-2H-indeno[1,2-c]pyridine and 4.54 g of methyl vinyl ketone in 150 cc of ethanol is heated to 80° for 2 hours. The mixture is evaporated to dryness, the residue is again dissolved in a small amount of ethanol, and the calculated amount of hydrochloric acid in ethanol is added. The resulting crystalline product is again recrystallized from ethanol and yields pure 1,3,4,9b-tetrahydro-5-methyl-2-(3-oxobutyl)-2H-indeno[1,2-c]pyridine hydrochloride having a M.P. of 164°–166° (decomp.).

The following compounds of formula I (Examples 18 to 20) may likewise be obtained in a manner analogous to that described in Example 17:

EXAMPLE 18

1,3,4,9b-Tetrahydro-5-methyl-2-(4,4-dimethyl-3-oxopentyl)-2H-indeno[1,2-c]pyridine M.P. of the hydrochloride—193°–194° (decomp.).

EXAMPLE 19

2-(3-Cyclopentyl-3-oxopropyl)-1,3,4,9b-tetrahydro-5-methyl-2H-indeno[1,2-c]pyridine M.P. of the hydrochloride—196°–198° (decomp.).

EXAMPLE 20

2-(3-Cyclohexyl-3-oxopropyl)-1,3,4,9b-tetrahydro-5-methyl-2H-indeno[1,2-c]pyridine M.P. of the hydrochloride—194°–196° (decomp.).

EXAMPLE 21

1,3,4,9b-Tetrahydro-5-methyl-2-(2-methyl-3-oxobutyl)-2H-indeno[1,2-c]pyridine

A solution of 14.5 g of 1,3,4,9b-tetrahydro-5-methyl-2H-indeno[1,2-c[pyridine and 7.9 g of isopropenyl methyl ketone in 150 cc of ethanol is kept at room temperature for 16 hours and subsequently at 80° for 2 hours. The ethanol is removed by evaporation, the residue is taken up in benzene and filtration is effected through a layer of aluminium oxide. The residue obtained after concentrating the benzene solution by evaporation is dissolved in acetone and the calculated amount of hydrochloric acid in ethanol is added. After recrystallization of the resulting crude hydrochloride from ethanol the hydrochloride of the title compound is obtained in pure form having a M.P. of 180°–182° (decomp.):

EXAMPLE 22

1,3,4,9b-Tetrahydro-5-methyl-2-(3-oxopentyl)-2H-indeno[1,2-c[pyridine

The hydrochloride of the title compound, having a M.P. of 176°–178° (decomp.), is obtained in a manner analogous to that described in Example 21.

EXAMPLE 23

1,3,4,9b-Tetrahydro-5-methyl-2-(5-methyl-3-oxohexyl)-2H-indeno[1,2-c]pyridine

A solution of 13.7 g of isobutyl vinyl ketone in 30 cc of dimethyl formamide is added dropwise at a temperature of 60° while stirring to a solution of 18.0 g of 1,3,4,9b-tetrahydro-5-methyl-2H-indeno[1,2-c]pyridine hydrochloride and 9.05 g of triethyl amine in 150 cc of dimethyl formamide. The reaction mixture is allowed to react at the same temperature for a further 20 minutes and is subsequently diluted with 500 cc of benzene. The reaction mixture is repeatedly extracted with water and the organic phase is dried over magnesium sulphate. The residue obtained after removing the solvent by evaporation is dissolved in methanol and the calculated amount of hydrochloric acid in ethanol and ether are added. The resulting crystalline product is again recrystallized from methanol/ether. M.P. of the hydrochloride 184°–186° (decomp.).

The following compounds of formula I (Examples 24 to 26) may likewise be obtained in a manner analogous to that described in Example 23;

EXAMPLE 24

2-(3-p-Chlorophenyl-3-oxopropyl)-1,3,4,9b-tetrahydro-5-methyl-2H-indeno[1,2-c]pyridine The residue obtained after removing the solvent by evaporation is dissolved in methanol and the calculated amount of hydrochloric acid in ethanol and ether are added. The resulting crude hydrochloride is converted into the free base by treatment with a potassium carbonate solution and extraction with chloroform, and the free base is purified by recrystallizing twice from benzene/petroleum ether. M.P. 96°–99°.

EXAMPLE 25

2-(3-p-Bromophenyl-3-oxopropyl)-1,3,4,9b-tetrahydro-5-methyl-2H-indeno[1,2-c]pyridine Isolation as indicated in Example 24.
M.P. 120°–124° from benzene/petroleum ether.

EXAMPLE 26

1,3,4,9b-Tetrahydro-2-(3-p-methoxyphenyl-3-oxopropyl)-5-methyl-2H-indeno[1,2-c]pyridine Isolation as indicated in Example 24.
M.P. 95°–97° from benzene/petroleum ether.

EXAMPLE 27

1,3,4,9b-Tetrahydro-5-methyl-2-(3-oxo-3-phenylpropyl)-2H-indenol[1,2-c]pyridine

A suspension of 7.0 g of 1,3,4,9b-tetrahydro-5-methyl-2H-indeno[1,2-c]pyridine hydrochloride, 4.9 g of acetophenone and 9.5 g of paraformaldehyde in 120 cc of ethanol is heated to the boil while stirring for 18 hours. The reaction mixture is filtered, the filtrate is evaporated to dryness and the resulting residue is recrystallized from ethanol/petroleum ether. M.P. of the hydrochloride 184°–185°.

EXAMPLE 28

2-(3-p-Fluorophenyl-3-oxopropyl)-1,3,4,9b-tetrahydro-5-methyl-2H-indeno[1,2-c]pyridine A mixture of 18.0 g of 1,3,4,9b-tetrahydro-5-methyl-2H-indeno[1,2-c[pyridine hydrochloride, 10.2 g of p-fluoro-acetophenone and 2.75 g of paraformaldehyde in 75 cc of ethanol is heated to the boil at reflux while stirring for 1 hour. A further 2.75 g of paraformaldehyde are added, the mixture is allowed to boil at reflux for 1 hour, and a further 5.5 g of paraformaldehyde are subsequently added. The mixture is allowed to react at the boil for a further 4 hours and is subsequently cooled on ice. The resulting crystalline product is further purified by recrystallizing twice from ethanol/water and once from methanol. M.P. of the hydrochloride 200°–203°.

The following compounds of formula I (Examples 29 to 34) may likewise be obtained in a manner analogous to that described in Example 28:

Example 29

1,3,4,9b-Tetrahydro-5-methyl-2-(3-oxo-3-m-tolylpropyl)-2H-indeno[1,2-c]pyridine

M.P. of the hydrochloride—180°–182° (decomp.).

EXAMPLE 30

1,3,4,9b-Tetrahydro-5-methyl-(3-oxo-3-o-tolyl-propyl)-2H-indeno[1,2-c]pyridine

The crude hydrochloride obtained from the reaction is converted into the crude base by treatment withh a potassium carbonate solution and extraction with chloroform. The calculated amount of maleic acid is added to a solution of this crude base in acetone and the resulting crystalline product is purified by recrystallizing twice from 90 % methanol. M.P. of the hydrogen maleate 166°–168° (decomp.).

EXAMPLE 31

1,3,4,9b-Tetrahydro-2-(3-m-methoxyphenyl-3-oxo-propyl)-5-methyl-2H-indeno[1,2-c]pyridine M.P. of the hydrochloride—183°–185° (decomp.) from 95 % ethanol.

EXAMPLE 32

2-(3-p-Chlorophenyl-3-oxopropyl)-1,3,4,9b-tetrahy-dro-5-methyl-2H-indeno[1,2-c]pyridine The free base is produced from the crude hydrochloride obtained from the reaction by treatment with a potassium carbonate solution and extraction with chloroform, and this free base is purified by recrystallizing twice from benzene/petroleum ether. M.P. 96°–99°.

EXAMPLE 33

2-(3-p-Bromophenyl-3-oxopropyl)-1,3,4,9b-tetrahy-dro-5-methyl-2H-indeno[1,2-c]pyridine M.P. 120°–124° (working up as indicated in Example 32).

EXAMPLE 34

1,3,4,9b-Tetrahydro-2-(3-p-methoxyphenyl-3-oxo-propyl)-5-methyl-2H-indeno[1,2-c]pyridine M.P. 95°–97° (working up as indicated in Example 32).

EXAMPLE 35

1,3,4,9b-Tetrahydro-5-methyl-2-(4,4-dimethyl-3-oxopentyl)-2H-indeno[1,2-c]pyridine A mixture of 18.0 g of 1,3,4,9b-tetrahydro-5-methyl-2H-indeno[1,2-c]pyridine hydrochloride, 10.6 g of pinacoline and 24.4 g of paraformaldehyde in 100 cc of glacial acetic acid is heated to 120° for 2 hours while stirring. The reaction mixture is subsequently evaporated to dryness and the resulting residue is taken up in water. The mixture is made alkaline by the addition of solid potassium carbonate, and extraction is effected with benzene. The crude base obtained after evaporating the dried benzene extracts is dissolved in acetone, and the calculated amount of hydrochloric acid in ethanol is added. The resulting crystalline product is further purified by recrystallization from methanol/ether. M.P. of the hydrochloride 193°–194° (decomp.).

The 1,3,4,9b-tetrahydro-5-methyl-2H-indeno[1,2-c]-pyridine, employed in the above Examples, may be prepared as follows:

68.8 g of chloroformic acid ethyl ester are added dropwise while stirring to a solution of 21 g of 1,3,4,9b-tetrahydro-2,5-dimethyl-2H-indeno[1,2-c]pyridine in 90 cc of absolute benzene. The reaction solution is then heated to the boil for 4 hours and after cooling to room temperature is extracted twice with water and once with 2 N hydrochloric acid. The organic phase is dried over magnesium sulphate and concentrated by evaporation. The resulting residue is distilled in a high vacuum, whereby pure 2-ethoxycarbonyl-1,3,4,9b-tetrahy-dro-5-methyl-2H-indeno[1,2-c]pyridine, having a B.P. of 143°–145°/0.02 mm of Hg, is obtained.

12 g of solid potassium hydroxide are added to a solution of 117 g of 2-ethoxycarbonyl-1,3,4,9b-tetrahy-dro-5-methyl-2H-indeno[1,2-c]pyridine in 120 cc of n-butanol, and the mixture is heated to the boil for 3 hours. The reaction mixture is concentrated by evaporation on a rotary evaporator, the residue is taken up in water and the solution is repeatedly extracted with chloroform. The chloroform extracts are dried over magnesium sulphate and subsequently concentrated by evaporation. The resulting crude base is converted into the hydrochloride by dissolving the evaporation residue in ethanol and adding the calculated amount of hydrochloric acid in ethanol. The solution is evaporated to dryness and the residue is crystallized twice from ethanol/ether. Pure 1,3,4,9b-tetrahydro-5-methyl-2H-indeno[1,2-c]pyridine hydrochloride has a M.P. of 182°–184°.

The 1,3,4,9b-tetrahydro-2,5-dimethyl-2H-indeno[1,2-c]-pyridine, used as starting material, may be produced as follows:

a. 100 cc of a 4.4 % solution of methyl lithium in ether is added dropwise at −30° while stirring to a suspension of 32.2 g of 1,3,4,4a,5,9b-hexahydro-2-methyl-2H-indeno[1,2-c]pyridin-5-one in 300 cc of absolute ether. After the addition is completed the reaction mixture is stirred at −20° for 3 hours, and 90 cc of a 20 % ammonium chloride solution are added dropwise while cooling with ice and in an atmosphere of nitrogen, and the mixture is extracted with ether. The combined ether extracts are dried over magnesium sulphate, the magnesium sulphate is removed by filtration and the filtrate is evaporated to dryness. The residue, a crystalline crude product, is recrystallized twice from diisopropyl ether, whereby pure 1,3,4,4a,5,9b-hexahy-dro-2,5-dimethyl-5(2H)-indeno[1,2-c]pyridinol, having a M.P. of 132°–134°, is obtained.

b. A solution of 14 g of 1,3,4,4a,5,9b-hexahydro-2,5-dimethyl-5(2H)-indeno[1,2-c]pyridinol in 200 cc of a 5 N solution of hydrogen chloride in ethanol is heated to the boil under reflux for 15 minutes. The solution is subsequently evaporated to dryness. After recrystallizing the residue twice from isopropanol pure 1,3,4,9b-tetrahydro-2,5-dimethyl-2H-indeno[1,2-c]pyridine hydrochloride, having a M.P. of 203°–205° (decomp.), is obtained.

What is claimed is:

1. A pharmaceutically acceptable acid addition salt of the formula:

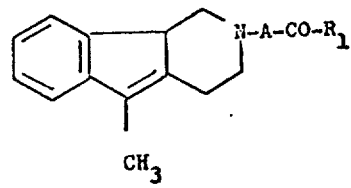

wherein
R₁ is lower alkyl of one to four carbon atoms, cycloalkyl of five or six carbon atoms, phenyl or phenyl monosubstituted by chlorine, bromine, fluorine, methoxy, methylthio or lower alkyl of one to four carbon atoms, and A is a straight or branched alkylene chain of one to four carbon atoms.

2. A compound of claim 1, wherein $R_1$ is phenyl, or phenyl monosubstituted by chlorine, bromine, fluorine, methoxy or lower alkyl of one to four carbon atoms.

3. A compound of claim 1, wherein $R_1$ is cycloalkyl of five to six carbon atoms.

4. A compound of claim 1, wherein $R_1$ is lower alkyl of one to four carbon atoms.

5. A pharmaceutically acceptable acid addition salt of the formula:

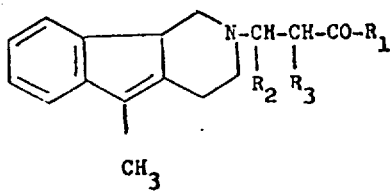

wherein $R_1$ is lower alkyl of one to four carbon atoms, cycloalkyl of five or six carbon atoms, phenyl, or phenyl monosubstituted by chlorine, bromine, fluorine, methoxy, methylthio or lower alkyl of one to four carbon atoms, and $R_2$ and $R_3$ are hydrogen, or alkyl of one to two carbon atoms.

6. The compound of claim 1, which is 2-acetonyl-1,3,4,9b-tetrahydro-5-methyl-2H-indeno[1,2-c]pyridine.

7. The compound of claim 1, which is 1,3,4,9b-tetrahydro-5-methyl-2-(2-oxophenethyl)-2H-indeno[1,2-c]pyridine.

8. The compound of claim 1, which is 1,3,4,9b-tetrahydro-5-methyl-2-(5-methyl-3-oxohexyl)-2H-indeno[1,2-c]pyridine.

9. The compound of claim 1, which is 1,3,4,9b-tetrahydro-5-methyl-2-(6-oxobutyl)-2H-indeno[1,2-c]pyridine.

10. The compound of claim 1, which is 1,3,4,9b-tetrahydro-5-methyl-2-(2-methyl-3-oxobutyl)-2H-indeno[1,2-c]pyridine.

11. The compound of claim 1, which is 1,3,4,9b-tetrahydro-5-methyl-2-(3-oxopentyl)-2H-indeno[1,2-c]pyridine.

12. The compound of claim 1, which is 1,3,4,9b-tetrahydro-5-methyl-2-(4,4-dimethyl-3-oxopentyl)-2H-indeno[1,2-c]pyridine.

13. The compound of claim 1, which is 1,3,4,9b-tetrahydro-5-methyl-2-(4-methyl-3-oxopentyl)-2H-indeno[1,2-c]pyridine.

14. The compound of claim 1, which is 1,3,4,9b-tetrahydro-5-methyl-2-(4-oxopentyl)-2H-indeno[1,2-c]pyridine.

15. The compound of claim 1, which is 2-(4-p-fluorophenyl-4-oxobutyl)-1,3,4,9b-tetrahydro-5-methyl-2H-indeno[1,2-c]pyridine.

16. The compound of claim 1, which is 2-(3-cyclopentyl-3-oxopropyl)-1,3,4,9b-tetrahydro-5-methyl-2H-indeno[1,2-c]pyridine.

17. The compound of claim 1, which is 2-(3-cyclohexyl-3-oxopropyl)-1,3,4,9b-tetrahydro-5-methyl-2H-indeno[1,2-c]pyridine.

18. The compound of claim 1, which is 1,3,4,9b-tetrahydro-2-m-methoxyphenacyl-5-methyl-2H-indeno[1,2-c]pyridine.

19. The compound of claim 1, which is 2-p-bromophenacyl-1,3,4,9b-tetrahydro-5-methyl-2H-indeno[1,2-c]pyridine.

20. The compound of claim 1, which is 2-p-chlorophenacyl-1,3,4,9b-tetrahydro-5-methyl-2H-indeno[1,2-c]pyridine.

21. The compound of claim 1, which is 1,3,4,9b-tetrahydro-2-p-[methoxyphenacyl-]5-methyl-2H-indeno[1,2-c]pyridine.

22. The compound of claim 1, which is 2-(3-p-chlorophenyl-3-oxopropyl)-1,3,4,9b-tetrahydro-5-methyl-2H-indeno[1,2-c]pyridine.

23. The compound of claim 1, which is 2-(3-p-bromophenyl-3-oxopropyl)-1,3,4,9b-tetrahydro-5-methyl-2H-indeno[1,2-c]pyridine.

24. The compound of claim 1, which is 1,3,4,9b-tetrahydro-2-(3-p-methoxyphenyl-3-oxopropyl)-5-methyl-2H-indeno[1,2-c]pyridine.

25. The compound of claim 1, which is 1,3,4,9b-tetrahydro-5-methyl-2-(3-oxo-3-phenylpropyl)-2H-indeno[1,2-c]pyridine.

26. The compound of claim 1, which is 2-(3-p-fluorophenyl-3-oxopropyl)-1,3,4,9b-tetrahydro-5-methyl-2H-indeno[1,2-c]pyridine.

27. The compound of claim 1, which is 1,3,4,9b-tetrahydro-5-methyl-2-(3-oxo-3-m-tolylpropyl)-2H-indeno[1,2-c]pyridine.

28. The compound of claim 1, which is 1,3,4,9b-tetrahydro-5-methyl-(3-oxo-3-o-tolylpropyl)-2H-indeno[1,2-c]pyridine.

29. The compound of claim 1, which is 1,3,4,9b-tetrahydro-2-(3-m-methoxyphenyl-3-oxopropyl)-5-methyl-2H-indeno[1,2-c]pyridine.

30. A free base of the formula:

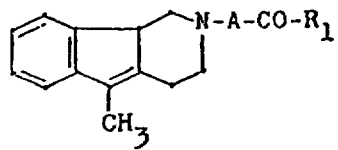

wherein $R_1$ is phenyl or phenyl monosubstituted by chlorine, bromine, fluorine, methoxy, or lower alkyl of one to four carbon atoms, and A is a straight or branched alkylene chain of one to four carbon atoms.

31. The compound of claim 30, which is 2-(3-p-chlorophenyl-3-oxopropyl)-1,3,4,9b-tetrahydro-5-methyl-2H-indeno[1,2-c]-pyridine.

32. The compound of claim 30, which is 2-(3-p-bromophenyl-3-oxopropyl)-1,3,4,9b-tetrahydro-5-methyl-2H-indeno[1,2-c]pyridine.

33. The compound of claim 30, which is 1,3,4,9b-tetrahydro-2-(3-p-methoxyphenyl-3-oxopropyl)-5-methyl-2H-indeno[1,2-c]pyridine.

* * * * *